May 10, 1960   H. D. PARKS ET AL   2,935,844
SYSTEM FOR FEEDING COMBUSTION FLUIDS TO ROCKET MOTORS
Filed May 25, 1948

Inventor:
Herman D. Parks
Richard W. Porter
by
Their Attorney.

United States Patent Office 2,935,844
Patented May 10, 1960

2,935,844

SYSTEM FOR FEEDING COMBUSTION FLUIDS TO ROCKET MOTORS

Herman D. Parks and Richard W. Porter, Schenectady, N.Y., assignors to General Electric Company, a corporation of New York Application May 25, 1948, Serial No. 29,135

6 Claims. (Cl. 60—39.46)

This invention relates to a system for feeding combustion fluids to rocket motors and more particularly to a valve system adapted to control and maintain the flow of fuel from fuel tanks subjected to large radial accelerations.

In machines and projectiles wherein liquid fuel is used, it has been observed that under conditions of large accelerations, the liquid fuel will be displaced to certain portions of the fuel tank leaving other portions of the fuel tank free from contact with the fuel. Then if the fuel tank has but a single port to the fuel feed line, it is conceivable that under accelerations at certain positions the port to the fuel feed line will not be in position to permit liquid to enter and as such the flow of fuel to the motor or engine will be interrupted.

Then, too, if the ports leading to the liquid lines are exposed by the displacement of the liquid in the tank and if the tank is being pressurized by a gas, the pressurized gas will enter the exposed ports and both the pressure of the gas will be lost and the continuity of the liquid in the feed line will be interrupted, resulting in intermittent feeding of the liquid to the combustion chamber.

Thus, one object of this invention is to devise a system of placing fuel ports in a fuel tank so that at no time is fuel flow interrupted.

Another object of this invention is to provide an automatic control system in conjunction with the fuel porting system to insure continual fuel flow.

Further objects and advantages of this invention will become apparent as the following description proceeds and the features of novelty which characterize this invention will be pointed out with particularity in the claims annexed to and forming a part of this specification.

Figure 1:
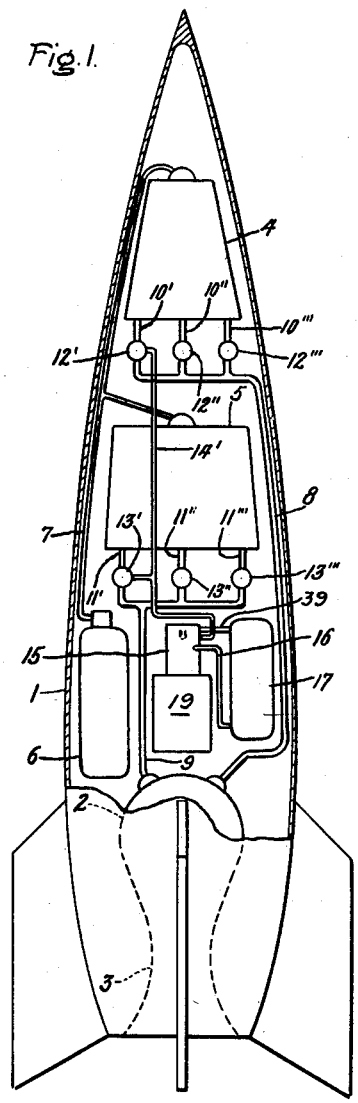

In the drawing, Fig. 1 is a partial sectional view of a rocket powered projectile having a fuel flow system embodying the invention herein described.

Figure 2:
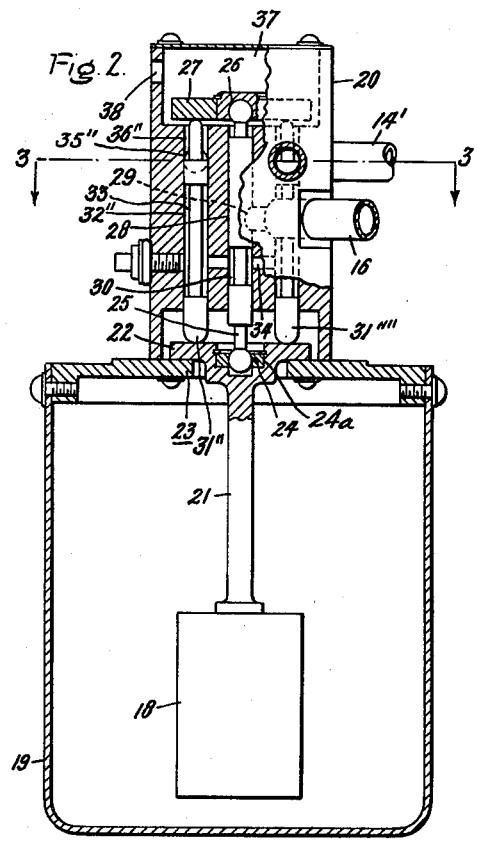
Figure 3:
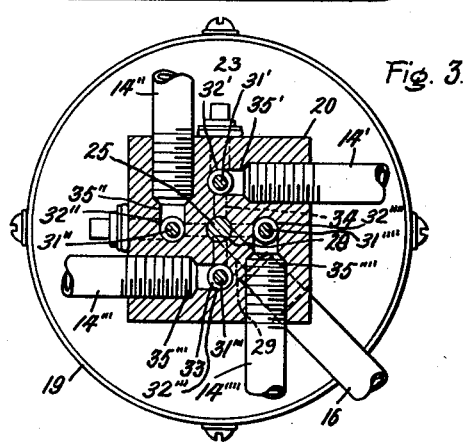

Fig. 2 shows in detail the pendulum operated automatic control valve for said fuel flow system, and Fig. 3 is a transverse, horizontal sectional view taken on line 3—3 of Fig. 2.

Referring more particularly to Fig. 1 of the drawings, it will be observed that 1 refers to a rocket projectile housing which has mounted in it a combustion chamber 2 communicating with a nozzle 3 which transforms the energy of combustion of the fuel in combustion chamber 2 to directed velocity energy of the escaping gases to give the rocket thrust to the projectile. There is also shown a tank 4 which contains the liquid oxygen and a tank 5 which contains the liquid fuel, usually alcohol. Also shown is a high pressure gas container 6 which feeds its contents through a feed line 7 to each of the liquid tanks 4 and 5. Tanks 4 and 5 are connected by liquid feed lines 8 and 9 to the combustion chamber 2. Each liquid tank 4 and 5 is provided with the same number of outlet ports numbered 10′, 10″, 10‴, 10⁗, in tank 4 and 11′, 11″, 11‴, 11⁗, in tank 5, ports 10⁗ and 11⁗ being behind ports 10″ and 11″ respectively and not visible. Ports 10 are manifolded to feed line 8 and ports 11 are manifolded to feed line 9. Each port 10′, 10″, etc., on tank 4 has a corresponding port 11′, 11″, etc., on tank 5 and the positions of the corresponding ports of each tank are substantially the same and are in part to part correspondence.

Interposed between each port 10 and the feed line 8 are hydraulically operated valves 12′, 12″, etc., and similarly between ports 11 and feed line 9 are hydraulically operated valves 13′, 13″, etc. The valves may be of the usual types well known to those in the art. Each set of corresponding valves is connected to a single hydraulic fluid line. These hydraulic fluid lines are denoted 14′, 14″, etc. (in Fig. 1 only 14′ is shown), and are manifolded to a pendulum operated control valve 15 which is connected by a hydraulic fluid line 16 to a high pressure hydraulic fluid source 17.

Fig. 2 is a partly broken away cross sectional view of the pendulum operated control valve 15 showing a pendulum bob 18 suspended within a housing 19 upon which is mounted the valve body 20. The pendulum bob 18 is suspended by staff 21 from a flanged bearing disc 22 supported on a circular shoulder 23. The bearing disc 22 contains a spherical bearing surface 24 on bearing 24a upon which rides a valving piece 25. The other end of piece 25 rides in a bearing surface 26 located in a bearing disc 27. The valving piece 25 further rides in a passageway 28 which is ported at 29 to the high pressure hydraulic fluid entering the valve through fluid line 16. Valving piece 25 is also turned down at a section to form a recess 30 for communicating with port 29. Riding between the inner faces of bearing discs 22 and 27 are four spherically ended valving pieces 31′, 31″, etc. These valving pieces 31 further are located in passageways 32′, 32″, etc., respectively best shown in Fig. 2. Each of the valving pieces 31 is also turned down at a section to form recesses 33 within the valving pieces 31. Passageways 34 are provided for communicating recess 30 to recesses 33. Outlet ports, 35′, 35″, etc. are provided and may be put in communication with their respective recess 33 upon movement of the corresponding valving piece 31. The outlet ports 35 are each respectively connected to its corresponding hydraulic fluid lines 14. The valving pieces 31 are further turned down in such a manner that when in a normally closed position they form recesses 36′, 36″, etc., which communicate with the respective outlet ports 35 to drain the hydraulic fluid lines 14. The fluid thus recovered is collected in chamber 37 and is returned through port 38 and conduit 39 to the hydraulic fluid reservoir 17.

Fig. 3 taken together with Fig. 2 more clearly shows the entire porting arrangement and particularly shows the order of numbering the hydraulic fluid lines 14. It will be noticed that the relative position of the outlet ports in the valve to the corresponding hydraulic fluid line is removed substantially 180° from the position of the corresponding liquid outlet ports located in tanks 4 and 5.

In operation the fuel system operates as follows. Valves 12 and valves 13 are normally open and the liquids are being manifolded to their respective feed lines. As the rocket enters a curved flight path, the pendulum bob is subjected to radial acceleration forces which displace the bob from its normal position about some bearing point located between the bearing disc flange 22 and the shoulder 23. As the pendulum bob rotates about the point of bearing, the remainder of the bearing disc flange also rotates about the bearing point. This results in a displacement of valving piece 25 so that recess 30 lines up to communicate high pressure hydraulic fluid port 29 with passageways 34. The rotation of the bearing disc flange also displaces some of the valving pieces 31 in such a manner that one or more of the recesses 33 are lined up to communicate passageways 34 to the corresponding fluid outlet port or pots 35.

When this happens, there is a complete path for the high pressure hydraulic fluid and certain of the valves 12 and the valves 13 are closed by the fluid pressure.

The purpose for closing the valves is that when the rocket enters the curved flight path the liquids in the tanks 4 and 5 are subject to radial acceleration forces and as such are displaced to one side of the tank leaving some of the outlet ports 10 and 11 free from liquid. If this is permitted the pressurizing gas from the container 6 will escape through the liquid feed lines 8 and 9 and will both disrupt the liquid flow and will result in loss of pressurizing gas pressure. By use of the invention described, sufficient fuel ports are provided so that at least one port is in contact with the liquid in the tank at all times and the others are automatically sealed when no longer in contact with the liquid in the tank. It should be apparent that the valve would be operative even if valving piece 25 were excluded. In that case the hydraulic fluid would operate the valves solely upon sufficient movement of the valving pieces 31 so as to expose ports 35. It is pointed out though that by accurate variation in the construction of only the single valving piece 25 one is able to achieve very accurate control over the minimum angle of deflection of the pendulum at which the fluid is permitted to flow, for only at a certain minimum displacement of valving piece 25 will passageway 30 communicate with hydraulic fluid inlet port 29. Uniformity of control is thus insured by the dependence of operation on the displacement of only the single piece 25.

It should be readily apparent to one skilled in the art that a designer can easily provide resistances to the motion of the pendulum bob to provide for initial operation of the pendulum valve control only at certain accelerations. It should also be apparent that this pendulum type control is not only limited to only a fuel system but is applicable to any control system upon which forces occur which may be used to actuate the pendulum bob.

Thus, while a particular embodiment of this invention is herein illustrated and described, further modifications will occur to those skilled in the art and it is to be understood, therefore, that this invention is not to be limited to the particular arrangement disclosed and it is intended that the appended claims will cover all modifications which do not depart from the spirit and scope of the invention.

What we claim as new and desire to secure by Letters Patent of the United States is:

1. A fluid supply system for furnishing the materials of combustion to a combustion chamber comprising a plurality of tanks containing liquid propellants, means for pumping the liquid propellants from said tanks, a plurality of outlets in each tank, the outlets in one tank being placed substantially in corresponding positions with respect to the outlets of the other tank or tanks, a plurality of feed lines adapted to lead to the combustion chamber for carrying the contents of the tank thereto, the plurality of outlets in each tank being manifolded to the corresponding feed line to the combustion chamber provided for each tank, a valve interposed between each tank outlet and the manifolded feed line, and an automatic acceleration operated valve selector for choosing the appropriate valves to be closed, said selector operating said valves by means of a fluid system.

2. A fluid supply system for furnishing the materials of combustion to a combustion chamber comprising a plurality of tanks containing liquid propellants, means for pumping the liquid propellants from said tanks, a plurality of outlets in each tank, the outlets in one tank being placed substantially in corresponding positions with respect to the outlets of the other tank or tanks, the plurality of outlets in each tank being manifolded to the corresponding feed line to the combustion chamber provided for each tank, a hydraulic fluid operated normally open valve interposed between each tank outlet and the manifolded feed line, a high pressure fluid system for operating said valves, and an automatic acceleration operated valve selector for choosing the valves to be closed.

3. A fluid supply system for furnishing the materials of combustion to a combustion chamber comprising a plurality of tanks containing liquid propellants, means for pumping the liquid propellants from said tanks, a plurality of outlets in each tank, the outlets in one tank being placed substantially in corresponding positions with respect to the outlets of the other tank or tanks, a plurality of feed lines adapted to lead to the combustion chamber for carrying the contents of the tank thereto, the plurality of outlets in each tank being manifolded to the corresponding feed line to the combustion chamber provided for each tank, a hydraulic fluid operated normally open valve interposed between each tank outlet and the manifolded feed line, and means for closing each valve comprising a fluid system for operating said valves.

4. A fluid supply system for furnishing the materials of combustion to a combustion chamber comprising a plurality of tanks containing liquid propellants, means for pumping the liquid propellants from said tanks, a plurality of outlets in each tank, the outlets in one tank being placed substantially in corresponding positions with respect to the outlets of the other tank or tanks, a plurality of feed lines adapted to lead to the combustion chamber for carrying the contents of the tank thereto, the plurality of outlets in each tank being manifolded to the corresponding feed line to the combustion chamber provided for each tank, a hydraulic fluid operated normally open valve interposed between each tank outlet and the manifolded feed line, means for closing each valve comprising a fluid system for operating said valves, and means including an automatic acceleration operated valve selector for communicating the fluid to the valves to be closed.

5. A fluid supply system for furnishing the material of combustion to a combustion chamber comprising a plurality of tanks containing liquid propellants, means for pumping the liquid propellants from said tanks, a plurality of outlets in each tank, the outlets in one tank being placed substantially in corresponding positions with respect to the outlets of the other tank or tanks, a plurality of feed lines adapted to lead to the combustion chamber for carrying the contents of the tanks thereto, the plurality of outlets in each tank being manifolded to the corresponding feed line to the combustion chamber provided for each tank, a valve interposed between each tank outlet and the manifolded feed line, a fluid system connected to an automatic valve selector, and means for communicating the fluid from the valve selector to the valves so as to operate said valves.

6. A fluid supply system for furnishing the materials of combustion to a combustion chamber comprising a plurality of tanks containing liquid propellants, means for pumping the liquid propellants from said tanks, a plurality of outlets in each tank, the outlets in one tank being placed substantially in corresponding positions with respect to the outlets of the other tank or tanks, a plurality of feed lines adapted to lead to the combustion chamber for carrying the contents of the tanks thereto, the plurality of outlets in each tank being manifolded to the corresponding feed line to the combustion chamber provided for each tank, a valve interposed between each tank outlet and the manifolded feed line, a fluid system connected to an automatic pendulum operated valve selector, means for communicating the fluid from said valve selector to the valves so as to operate said valves, said pendulum operated valve selector being universally pivoted so as to be responsive to acceleration force.

(References on following page)

References Cited in the file of this patent

UNITED STATES PATENTS

| | | |
|---|---|---|
| 1,720,379 | Robertson | July 9, 1929 |
| 2,089,640 | Cotterman | Aug. 10, 1937 |
| 2,124,867 | Akerman | July 26, 1938 |
| 2,158,753 | Hansen | May 16, 1939 |
| 2,273,058 | Miller | Feb. 17, 1942 |
| 2,366,883 | Tydon | Jan. 9, 1945 |
| 2,393,805 | Parker | Jan. 29, 1946 |
| 2,394,506 | Woods | Feb. 5, 1946 |
| 2,394,853 | Goddard | Feb. 12, 1946 |
| 2,406,926 | Summerfield | Sept. 3, 1946 |